Figure 1:
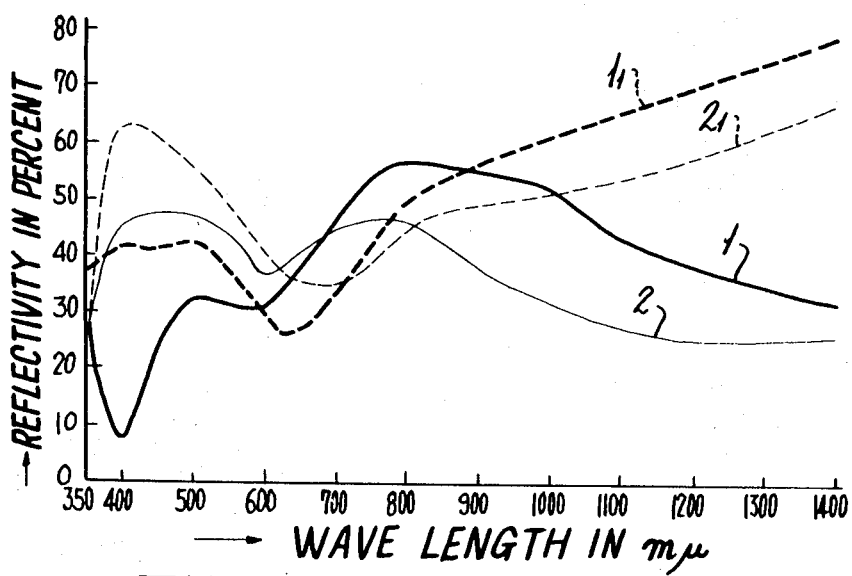

United States Patent

[11] 3,619,235

| [72] | Inventors | Shigemasa Furuuchi;<br>Takashi Mukaiyama, both of Yokohama, Japan |
|---|---|---|
| [21] | Appl. No. | 866,100 |
| [22] | Filed | Oct. 6, 1969 |
| [45] | Patented | Nov. 9, 1971 |
| [73] | Assignee | Asahi Glass Co., Ltd.<br>Tokyo, Japan |
| [32] | Priority | May 24, 1965 |
| [33] | | Japan |
| [31] | | 40/30164 |
| | | Continuation of application Ser. No. 551,566, May 20, 1966, now abandoned. |

[54] INFRARED REFLECTING GLASS AND METHOD FOR THE MANUFACTURE THEREOF
5 Claims, 2 Drawing Figs.

[52] U.S. Cl. ............................................. 117/33.3, 117/124 B, 350/1, 350/166
[51] Int. Cl. ........................................................ C03c 17/06
[50] Field of Search ............................................. 117/124, 71, 160, 33.3

[56] References Cited
UNITED STATES PATENTS

| 2,171,086 | 8/1939 | Gibson | 117/160 X |
| 2,628,927 | 2/1953 | Colbert et al. | 117/33.3 X |
| 2,676,117 | 4/1954 | Colbert et al. | 117/124 X |
| 2,757,104 | 7/1956 | Howes | 117/124 C |
| 3,018,191 | 1/1962 | Caban et al. | 117/71 X |
| 3,042,542 | 7/1962 | Anders | 117/33.3 |
| 3,087,831 | 4/1963 | Browne | 117/124 X |
| 3,185,020 | 5/1965 | Thelen | 117/33 X |
| 3,266,912 | 8/1966 | Murphy | 117/124 X |

FOREIGN PATENTS

| 523,808 | 4/1956 | Canada | 117/71 |

Primary Examiner—William D. Martin
Assistant Examiner—Mathew R. P. Perrone
Attorney—Young and Thompson

ABSTRACT: An infrared reflecting layer is deposited on a surface of a glass sheet by thermal decomposition. The deposited layer is one or more oxides of Ti, Ta, W, Zr, Th, Sn or Nb containing uniformly dispersed microscopically fine particles of metallic gold and/or metallic platinum. The film is mechanically strong and chemically stable.

INVENTORS
SHIGEMASA FURUUCHI
TAKASHI MUKAIYAMA
BY
Young & Thompson
ATTYS.

INFRARED REFLECTING GLASS AND METHOD FOR THE MANUFACTURE THEREOF

This application is a continuation of U.S. application Ser. No. 551,566 filed May 20, 1966, and now abandoned.

The present invention relates to an infrared reflecting glass, the surface film of which reflects infrared energy contained in a light source, especially in sun light, and to a method for the manufacture thereof.

The term "glass" used herein is generally intended to mean soda-lime glass unless otherwise indicated.

At present, a glass sheet having on its surface a thin continuous film of metallic gold by vacuum evaporation is regarded as the most excellent infrared reflecting glass sheet. However, metallic gold is difficult to be adhered to the surface of a glass sheet and simultaneously its mechanical strength is remarkably low. Therefore, the metallic gold film is required to be protected with another glass. Accordingly, such an infrared reflecting glass sheet has to be used as a laminated glass or double glazed glass unit. For this reason, there were disadvantages in that the weight and bulk or volume of glass sheet become increased and the cost for its production is expensive. Furthermore, as the vacuum evaporation is employed for the formation of thin film, a large scale apparatus is needed and moreover, the operation is complicated.

In general, in case where an infrared reflecting film is provided on a glass surface in contact with atmospheric air, such a film is first required not to be easily peeled off from the glass surface. Therefore, such a film is requested to have a high adherent power to the surface of glass. Moreover, such a film should be of high weatherproofness and high mechanical strength. The most important matter is that not only the above-mentioned requirements should be satisfied, but also the infrared reflecting property should be excellent.

The present inventors have executed numerous experiments and laborious studies for a long period of time, taking into consideration the above described facts, and have newly found that metallic platinum has the infrared reflecting property comparable with that of metallic gold which is considered at present as the most excellent metal from a view point of infrared reflecting property. Thus, in the present invention, the said metallic gold has been adopted together with said metallic platinum. Nevertheless, each of both metals alone is considerably low in the adherent power to the surface of glass and the mechanical strength.

It is an object of the present invention to provide an improved infrared reflecting glass having both excellent mechanical strength and satisfactory adherent power to the glass surface as well as weatherproof property without substantially impairing the gold infrared reflecting characteristic property of the said metals, by forming a film of metallic oxides containing metallic gold and/or metallic platinum in a uniformly and microscopically divided form and having a refractive index higher than that of glass on the top glass surface, and a method for the manufacture of the glass described above.

Another object of the present invention is to provide an infrared reflecting glass having on its top surface a film of metallic oxide containing metallic gold and/or metallic platinum and at least one selected from the group consisting mainly of $TiO_2$, $Ta_2O_5$, $WO_3$, $ZrO_2$, $ThO_2$, $SnO_2$ and $Nb_2O_5$ and having a refractive index higher than that of the glass and a method for the manufacture of the glass as described above.

A further object of the present invention is to provide an improved infrared reflecting glass which can be manufactured without necessitating a special atmosphere, complex apparatus, devices, troublesome operation, and a method for the manufacture of such glass.

Other objects and advantageous features will be apparent from the following description of the invention.

For a better understanding of the invention, reference will now be made to the accompanying drawings, in which FIG. 1 and FIG. 2 respectively shows, by way of example, the reflection characteristics and transmission characteristics regarding the wave length range from visible region to near infrared region of the infrared reflecting glasses according to the present invention.

Figure 2:
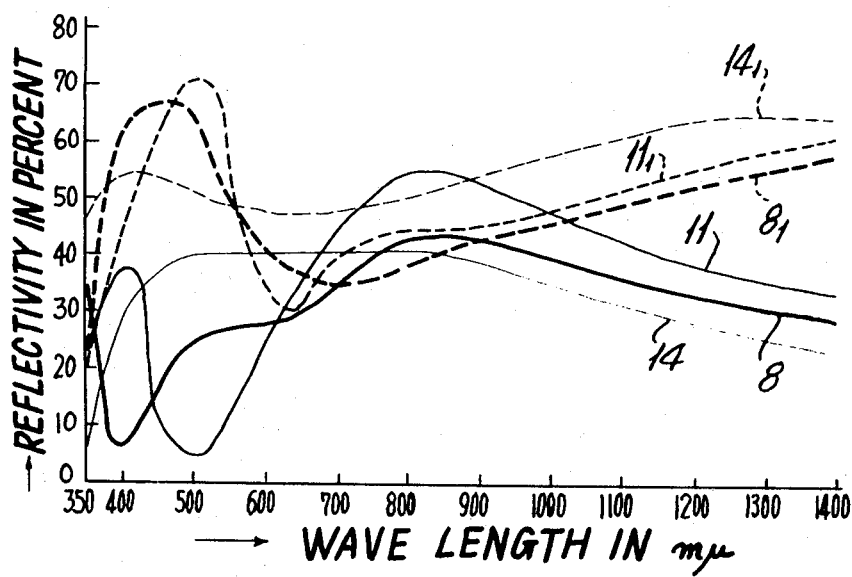

Referring to the drawings, in FIGS. 1 and 2 a curved solid line denotes reflection characteristics and a curved broken line transmission characteristics respectively, and the reflectivity and transmission in percent is shown by ordinate and the wave length in m$\mu$ by abscissa in each figure.

When metals such as Au and Pt are caused to be incorporated into the substances capable of bonding to network structure of glass, a strong adherent power to glass surface may be anticipated. Since metallic oxides have adherent power to the glass surface and mechanical strength and simultaneously are also chemically stable, the weatherproof property may be expected. However, the metal oxide for incorporating of metallic gold and platinum should not be substances which impairs high infrared reflectivity of Au and Pt. In fact, metallic gold and metallic platinum could not be incorporated into typical metallic oxide $SiO_2$ without impairing infrared reflectivity of metallic Au and Pt. Therefore, metallic oxide to be used for this purpose must be limited. According to this invention, it has been found that when metallic gold or metallic platinum is caused to be contained or to be incorporated in metallic oxide in the uniformly and microscopically divided form having a refractive index higher than that of glass, a film can be obtained which has an excellent adherent power to the glass surface, satisfactory mechanical strength and weatherproofness, without substantially deteriorating the high infrared reflectivity of gold and platinum. Thus, such metallic oxides are $TiO_2$, $Ta_2O_5$, $WO_3$, $ZrO_2$, $ThO_2$, $SnO_2$ and $Nb_2O_5$.

Such metallic oxides may be used respectively alone or in combination thereof in which Au and/or Pt may be incorporated. Films obtained by causing Au metal and/or Pt metal to be incorporated in $TiO_2$ and/or $Ta_2O_3$ may be considered satisfactory in every respect.

Further, films of the above-mentioned metallic oxide having a refractive index higher than that of glass (hereinafter shortly referred to as "a high refractive index metallic oxide" can be added in a small quantity of at least one oxide of Bi, Rh, Si, Mo, V, Sb and Ru. The resulting films become further better because of its increased hardness and smoothness (low coefficient of friction). Particularly, films obtained by admixing either or both of such metallic gold and metallic platinum and a small quantity of $BiO_2$, $Rh_2O_3$ and $SiO_2$ with either or both of $TiO_2$ and $Ta_2O_5$ are practically the most satisfactory. Said films shown an increased mechanical strength due to the fact that $Bi_2O_3$ and $Rh_2O_3$ contribute essentially to the increase of smoothness (the decrease of coefficient of friction) on one hand and $SiO_2$ contributes essentially to the increase of hardness of the film on the other hand, and thus the mechanical strength is heightened.

However, even such a film shows gradually its deterioration due to rays of light, that is, solarization takes place after a fairly long period of time elapsed, when such a film is placed in a position or place where fairly strong beams of light are always existent in a large amount. Films subjected to solarization degradate sometimes their clarity, which is an unfavorable phenomenon.

After further laborious studies, the present inventors have also found that when, independently of the composition of film, as least one of oxides of Cr, Mn, Fe, Co, Ni and Cu is added to such a film, the solarization of film can be avoided. In particular, a film added with a small quantity of an oxide of Cr, Ni or Co shows the lowest solarization.

Furthermore, in the present invention, only a metallic oxide having a high refractive index used for the incorporation of metallic gold and/or metallic platinum is coated on a glass surface to form a film (hereinafter shortly referred to as "an under coat film") and subsequently, a further film of a metallic oxide having a high refractive index and containing metallic gold and/or metallic platinum (hereinafter shortly referred to as "a main coat film") can be coated or formed on the said under coat film. In this case, $TiO_2$ film is chiefly coated on the surface of glass as an under coat film, and it is preferable that, as a main coat film, a film containing metallic gold and/or metallic platinum, and having $WO_3$ or $Ta_2O_5$ as its principal constituent, admixed chiefly with $Bi_2O_3$ or $Rh_2O_3$ is further coated on said under coat film.

On the other hand, in the present invention, good infrared reflecting characteristics of metallic gold and metallic platinum are substantially lowered when metallic gold and/or metallic platinum is incorporated or contained in metallic oxide having a refractive index lower than that of glass. However, in case where a film of metallic oxide having a refractive index lower than that of glass is first coated on the glass surface, and a further film of a high refractive index metallic oxide containing metallic gold and/or metallic platinum is then coated on the said film coated on the glass surface, a satisfactory result can be obtained. Thus, in the present invention, it is preferable to use $SiO_2$ as a metallic oxide having a refractive index lower than that of glass.

In fact, in case where a film of a high refractive metallic oxide containing metallic gold and/or metallic platinum is coated on the glass surface, the structure of said film should be uniform in any part of the film, taking into consideration the infrared reflecting property, adherent power to glass, mechanical strength and so forth. Therefore, metallic gold and metallic platinum existing already in the form of metal, for instance, such as gold leaf and the like, are very difficult to distribute uniformly in coexisting metallic oxide, even if they are in the form of finely divided particles. They, therefore, cannot be adopted for this purpose.

However, a metallic oxide existing already in the form of oxide cannot also be used, because of its low adherent power to the surface of glass.

According to the present invention, in order to obtain a film, wherein metallic gold and/or metallic platinum is contained uniformly in metallic oxide having a high refractive index and the adherent power to the glass surface is also strong, compounds capable of forming metallic gold and/or metallic platinum as well as compounds capable of forming high refractive metallic oxide may be used, and these compounds are then caused to convert or transform to a film having a high refractive index metallic oxide and containing metallic gold and/or metallic platinum on the surface of glass.

In practice of this process, compounds capable of forming metallic gold and/or platinum and other compounds capable of forming high refractive index metallic oxide are dissolved in the same solvent to produce a solution, and after said solution has been caused to adhere uniformly to the glass surface; this solution on the glass surface is heated in a temperature range from 400° C. to the softening point of glass, preferably 570° to 630° C. By so doing the solvent is evaporated and Au and/or Pt compound is simultaneously converted to metallic gold and/or metallic platinum, and other compounds converted to metallic oxide, and moreover, they can be uniformly dispersed each other and simultaneously can be formed into a film under the same conditions.

As Au compounds used in the present invention there may be used, for instance, chloroauric acid, gold-alkyl mercaptide such as gold-ethyl mercaptide, gold-n-propyl mercaptide, and gold-n-butyl mercaptide, and alkyl gold halide such as diethyl monobromo-gold. Furthermore, as Pt compounds, chloroplatinic acid may be used preferably.

As a compound capable of forming metallic oxide there may be used, for instance, alkoxide, halogenide, nitrate, acetate or the like. Alkoxide is the most preferable among these compounds.

Of course, it is possible to make the compounds capable of forming Au-compound and Pt-compound as well as compound capable of forming metallic oxide into an aqueous solution, but such aqueous solution is not preferable from the view points of stability of solution and of causing the compounds to adhere to the surface of glass uniformly.

In the present invention, considering the stability of solution and uniform adherence onto the glass surface, it is preferable that all the said compounds are dissolved together in at least one of lower aliphatic alcohols having one to four carbon atoms, such as methanol, ethanol, propanol or butanol to produce a solution. Particularly, a solution obtained by dissolving these compounds in a mixed alcohol consisting of one part by volume of ethanol and two parts by volume of n-butanol is chemically stable and the solution adheres to the glass surface is good state.

A method will now be described in the following wherein the solution thus prepared is caused to adhere to the glass surface and is then heated to form a film of a high refractive index metallic oxide containing metallic gold and/or metallic platinum.

A well washed and dried glass sheet is dipped in the prepared solution. Thereafter, the glass sheet is slowly drawn out of said solution at a predetermined speed in such a manner that the solution may uniformly adhere to the surface of the glass sheet, and then dried in the air. It is of course possible to adopt other means such as spraying to cause the solution to adhere to the one or both glass surfaces uniformly.

Thereafter, the glass thus drawn out is heated in the air in a range of temperatures from 400° C. to the softening temperature of glass, preferably 570° to 630° C., for around 10 minutes.

An under coat film is formed on the glass surface in a manner as described above, and then a main coat film is formed on said under coat film and in forming an under coat film, the same condition as the above may be adopted while the gold and/or platinum compound are not added. Also the solution as described above for forming the main coat film can be used as it is.

In practice of the process wherein an under coat film and a main coat film are successively formed on the surface of glass, the glass sheet previously washed and dried is dipped in said solution capable of forming an under coat film. Subsequently, the glass sheet is drawn out of the solution slowly at a predetermined speed so as to obtain an uniform adherence of the solution to the glass, after which the glass sheet is dried in the air at 100° to 130° C. for 5 to 20 minutes, preferably at 105° to 115° C. for around 10 minutes and then is allowed to cool to the room temperature. Then, the glass sheet thus treated is dipped in a solution capable of forming the main coat film, and then drawn out of said solution as before and after drying in the air, heated in the air at a temperature range from 400° C. to the softening temperature of glass, preferably at 570° to 630° C. for approximately 10 minutes. In this case, it is also possible to cause the solution capable of forming an under coat film to adhere to the glass and then heat the glass at a temperature above 400° C. and subsequently cause the solution capable of forming main coat film to adhere to said under coat film and heat this solution again above 400° C., but such means is not favorable because the resulted film, chiefly the main coat film gets hazy and is mottled.

The case will now be described in the following wherein a film of metallic oxide having a refractive index lower than that of glass is first formed on the glass surface, and a film of metallic oxide film containing metallic gold and/or metallic platinum is subsequently formed on said metallic oxide film.

As a metallic oxide having a refractive index lower than that of the glass, $SiO_2$ is the typical material. Also, in the case of $SiO_2$, $SiO_2$ itself is not favorable in view of adherent power to the glass surface. Therefore, generally, ethyl silicate is dissolved in a mixed alcohol composed 1 part by volume of ethanol and 2 parts by volume of n-butanol to produce a solution. A glass sheet is dipped in this solution. The subsequent manufacturing steps are entirely identical with the steps wherein an under coat film and main coat film are successively formed on the glass surface as described before.

In any cases when the present invention is carried out, the treatment can always be conducted in ordinary air. However, an oxidizing atmosphere or reducing atmosphere can also be used, and atmospheres of certain sorts of gases can, of course, be used.

The above described reference has been made to soda-lime glass, but the present invention is likewise applicable to polished glass, potash glass, borosilicate glass, barium crown glass, quartz glass and other transparent, opaque, colored glasses or the like and further, to heat absorption glass. In carrying out the present invention, an optical lens, spectacle lens, curved glass sheet or the like can be used, and the shape of glass is not limited.

The present invention is further described in the following Examples which are illustrative but not limitative thereof.

EXAMPLE 1

| | |
|---|---|
| $HAuCl_4 \cdot 4H_2O$ | 13.8 g. |
| $Ti(C_4H_9O)_4$ | 108.0 ml. |
| $RhCl_3$ | 1.6 g. |
| $BiCl_3$ | 3.9 g. |
| $Si(C_2H_5O)_4$ | 5.2 ml. |
| ethanol | 334.0 ml. |
| n-butanol | 666.0 ml. |

The above-mentioned chemicals were used to prepare a mixed solution. A soda-lime glass sheet of 3 mm. thick and 30 cm. × 30 cm. was well washed, dried and then dipped in the solution. Thereafter, this sheet glass was slowly drawn out of the solution and said solution adhered uniformly to the glass surface. Said sheet glass was then heated in a muffle furnace at 600° C. for 10 minutes.

The optical characteristics of the glass thus produced had an average reflectivity of approximately 53 percent in 700 m$\mu$ to 900 m$\mu$ (principal heat ray region of sun light) as shown by a curved solid line 1 and a curved broken line $1_1$ in FIG. 1.

The glass had the following mechanical strength, weatherproof property and chemical properties.

Hardness of film:
  pen tip and razor blade could not hurt the film.
Smoothness of surface:
  high smoothness (that is, coefficient of friction was small) was felt when rubbed by pen tips.
Weatherproof property:
  weather-O-meter (corresponding to 3 years)   no change Chemical properties:
  $H_2O$ (60° to 80° C.) 4 to 12 hr.    no change
  $1(COOH)_2$ aqueous solution (60° to 80° C.) 4 to 12 hr.
  no change
Solarization:
  Exposure to 500 W Xenon Lamp 24 to 72 hr.    no change From the above results, it is apparent that the product made by the present invention is superior to the usually known infrared reflecting glass.

EXAMPLE 2

| | |
|---|---|
| $HAuCl_4 \cdot 4H_2O$ | 13.8 g. |
| $TaCl_5$ | 210.7 g. |
| $RhCl_3$ | 1.6 g. |
| $BiCl_3$ | 3.9 g. |
| $Si(C_2H_5O)_4$ | 5.2 ml. |
| ethanol | 334.0 ml. |
| n-butanol | 666.0 ml. | were used to prepare a mixed solution. In said solution, a soda-lime glass sheet of 3 mm. thick and 30 cm. × 30 cm. was dipped after washing and drying. Thereafter, said glass sheet was slowly drawn out of the solution to cause the solution to adhere uniformly to the glass surface. The resulting glass sheet was heated at 600° C. for 10 minutes in a muffle furnace.

The optical properties of the product thus obtained showed an average reflectivity of approximately 45 percent in 700 m$\mu$ to 900 m$\mu$ as shown by a curved solid line 2 and a curved broken line $2_1$ in FIG. 1.

The present product had the following mechanical strength, weatherproof property and chemical properties:

Hardness of film:
  the product could not be hurt by pen tip and razor blade.
Smoothness of surface:
  high smoothness (i.e. low coefficient of friction) was felt when rubbed with pen tips.
Weatherproof property:
  weather-O-meter (corresponding to 3 years)   no change Chemical properties:
  $H_2O$ (60° to 80° C.) 4 to 12 hr.    no change
  $1(COOH)_2$ aqueous solution (60° to 80° C.) 4 to 12 hr.
  no change
Solarization:
  Exposure to 500W Xenon Lamp 24 to 72 hr.    no change

EXAMPLE 3

Soda-lime glass sheets each having 3 mm. thick and 30cm. × 3030 cm. were treated under the same condition as in Example 1 with five sorts of solution having different compositions as shown in the following:

| | | | | | |
|---|---|---|---|---|---|
| $HAuCl_4 \cdot 4H_2O$, g | 13.8 | 13.8 | 13.8 | 13.8 | 13.8 |
| $BiCl_3$, g | 3.9 | 3.9 | 3.9 | 3.9 | 3.9 |
| $RhCl_3$, g | 1.6 | 1.6 | 1.6 | 1.6 | 1.6 |
| $Th(NO_3)_3 \cdot 4H_2O$, g | 324.8 | | | | |
| $ZrCl_4$, g | | 143.2 | | | |
| $SnCl_4$, g | | | 153.2 | | |
| $NbCl_5$, g | | | | 158.9 | |
| $WCl_6$, g | | | | | 233.3 |
| Ethanol, ml | 334.0 | 334.0 | 334.0 | 334.0 | 334.0 |
| n-Butanol, ml | 666.0 | 666.0 | 666.0 | 666.0 | 666.0 |
| Average reflectivity in 700 m$\mu$ to 900 m$\mu$, percent | 45 | 47 | 47 | 45 | 48 |

EXAMPLE 4

5.5 g. $MoCl_5$ and 6.7 $RuCl_3$ were added to the solution used in example 1. A soda-lime glass sheet of 3 mm. thick and 30cm. ×3030 cm. was treated with the said solutions under the same condition as in example 1.

The product thus obtained showed an average reflectivity of approximately 45 percent in 700 m$\mu$ to 900 m$\mu$.

EXAMPLE 5

9.3 g. $VOCl_3$ was added to the solution as used in example 1.
A soda-lime glass sheet of 3 mm. thick and 30cm. × 30cm. was treated with the said solution under the same condition as in example 1.

The product thus obtained showed an average reflectivity of approximately 44 percent in 700 m$\mu$ to 900 m$\mu$.

EXAMPLE 6

13.4 g. $SbCl_3$ was added to the solution as used in example 1.

A soda-lime glass sheet of 3 mm. thick and 30cm. × 3030 cm. was treated with the said solution under the same condition as adopted in example 1.

The product showed an average reflectivity of approximately 45 percent in 700 m$\mu$ to 900 m$\mu$.

EXAMPLE 7

A mixed solution composed of the following chemicals:
10 percent by weight Au-ethyl mercaptide solution 67.4 ml.*

| | |
|---|---|
| $TaCl_5$ | 14.4 g. |
| $BiCl_3$ | 4.7 g. |
| $RhCl_3$ | 1.9 g. |
| ethanol | 434.0 ml. and |
| n-butanol | 868.0 ml. |

(* solvent containing one part by volume ethanol and two parts by volume n-butanol was used) was prepared. A soda-lime glass sheet of 3 mm. thick and 30cm. × 3030 cm. was treated with said solution under the same condition as in example 1.

The product had an average reflectivity of approximately 40 percent in 700 m$\mu$ to 900 m$\mu$.

EXAMPLE 8

A mixed solution having the following composition:

| | |
|---|---|
| $Ti(C_4H_9O)_4$ | 268.8 ml. |
| ethanol | 334.0 ml. and |
| n-butanol | 666.0 ml. | was prepared. A soda-lime glass sheet of 3 mm. thick and 30cm. × 3030 cm. was well washed, dried and then dipped in said solution. Thereafter, said glass sheet was slowly drawn out of the solution, and said solution adhered uniformly to the glass surface. The glass sheet was dried at 110° C. for 10 minutes in a muffle furnace, and then allowed to cool to the room temperature.

Thereafter, the said glass sheet was dipped in a mixed solution having the following composition:

| | |
|---|---|
| $HAuCl_4 \cdot 4H_2O$ | 13.8 g |
| $TaCl_5$ | 12.0 g |
| $BiCl_3$ | 3.9 g |
| ethanol | 334.0 ml and |
| n-butanol | 666.0 ml. | and then slowly drawn out of the solution.

The glass sheet was heated at 600° C. for 10 minutes in a muffle furnace.

The optical characteristics of the product thus obtained had an average reflectivity of approximately 40 percent in 700 m$\mu$ to 900 m$\mu$, as shown by a curved solid line 8 and a curved broken line $8_1$ in FIG. 2.

The present product showed the following mechanical strength, weatherproof property and chemical properties:

Hardness of film:
  it can not be hurt with a pen tip and razor blade.
Smoothness of surface:
  high smoothness (i.e. a low coefficient of friction) was felt when rubbed with a pen tip.
Weatherproof property:
  weather-O-meter (corresponding to 3 years)   no change Chemical properties:
  $H_2O$ (60° to 80° C.) 4 to 12 hr.   no change  $1N(COOH)_2$ aqueous solution (60° to 80° C.) 4 to 12 hr.   no change
Solarization:
  Exposure to 500W Xenon Lamp 24 to 72 hr.   no change

EXAMPLE 9

A mixed solution having the following composition:

| | |
|---|---|
| $Ti(C_4H_9O)_4$ | 268.8 ml |
| ethanol | 334.0 ml and |
| n-butanol | 666.0 ml | was prepared. A soda-lime glass sheet of 3 mm. thick and 30cm. × 3030 cm. was well washed, dried and then dipped in said solution. Thereafter, said glass sheet was slowly drawn out of the solution. The glass sheet was dried at 110° C. for 10 minutes in a muffle furnace and then allowed to cool to the room temperature.

Then, said glass sheet was further dipped in a mixed solution which comprises

| | |
|---|---|
| $HAuCl_4 \cdot 4H_2O$ | 13.8 g |
| $WCl_6$ | 13.3 g |
| $BiCl_3$ | 3.9 g |
| $RhCl_3$ | 1.3 g |
| $Co(NO_3)_2 \cdot 6H_2O$ | 0.1 g |
| ethanol | 334.0 ml and |
| n-butanol | 666.0 ml | and then this glass sheet was slowly drawn out of the solution.

Said glass sheet was subsequently heated at 600° C. for 10 minutes in a muffle furnace.

The product thus obtained showed an average reflectivity of approximately 45 percent in 700 m$\mu$ to 900 m$\mu$.

EXAMPLE 10

A mixed solution having the following composition:

| | |
|---|---|
| $Ti(C_4H_9O)_4$ | 268.8 ml |
| ethanol | 334.0 ml. and |
| n-butanol | 666.0 ml. | was prepared. A soda-lime glass sheet of 3 mm. thick and 30cm. × 3030 cm. was well washed, dried and dipped in said solution. Thereafter, said glass sheet was slowly drawn out of the solution and said solution adhered uniformly to the surface of glass. This glass sheet was dried at 110° C. for 10 minutes in a muffle furnace, and then allowed to cool to the room temperature.

Then, said glass sheet was dipped in a mixed solution having the following composition:

| | |
|---|---|
| $HAuCl_4 \cdot 4H_2O$ | 13.8 g. |
| $WCl_6$ | 6.5 g. |
| $TaCl_5$ | 6.0 g. |
| $BiCl_3$ | 3.9 g. |
| $RhCl_3$ | 1.3 g. |
| ethanol | 334.0 ml. and |
| n-butanol | 666.0 ml. | and then drawn out of the solution slowly.

The said glass sheet thus drawn out was heated at 600° C. for 10 minutes in a muffle furnace. The present product thus obtained had an average reflectivity of approximately 48 percent in 700 m$\mu$ to 900 m$\mu$.

EXAMPLE 11

A mixed solution having the following composition:

| | |
|---|---|
| $Si(C_2H_5O)_4$ | 162.0 ml. |
| ethanol | 300.0 ml. and |
| n-butanol | 600.0 ml. | was prepared. A soda-lime glass sheet of 3 mm. thick and 30 cm. × 3030 cm. was thoroughly washed, dried and then dipped in said solution. Thereafter, said glass sheet was slowly drawn out of the solution. Said glass sheet was subsequently dried at 110° for 10 minutes in a muffle furnace and then allowed to cool to the room temperature.

The thus treated glass sheet was then dipped in a mixed solution composed of

| | |
|---|---|
| $HAuCl_4 \cdot 4H_2O$ | 13.8 g |
| $TaCl_5$ | 12.0 g |
| $BiCl_3$ | 3.9 g |
| $RhCl_3$ | 1.3 g |
| ethanol | 334.0 ml. and |
| n-butanol | 666.0 ml |

Thereafter said glass sheet was slowly drawn out of glass sheet.

Said glass sheet thus drawn out was heated at 600° C. for 10 minutes in a muffle furnace.

The present product thus obtained had optical characteristics of an average reflectivity of approximately 45 percent in 700 m$\mu$ to 900 m$\mu$ as shown by a curved solid line 11 and a curved broken line $11_1$ in FIG. 2.

The present product had the following mechanical strength, weatherproof property and chemical properties:

Hardness of film:
  it could not be hurt with a pen tip and razor blade.
Smoothness of surface:
  high smoothness (low coefficient of friction) was felt when rubbed with a pen tip.
Weatherproof property:
  weather-O-meter (corresponding to 3 years)   no change Chemical properties:
  $H_2O$ (60° to 80° C.) 4 to 12 hr.   no change
  $1N(COOH)_2$ aqueous solution (60° to 80° C.) 4 to 12 hr.   no change
Solarization:
  Exposure to 500W Xenon Lamp 24 to 72 hr.   no change

EXAMPLE 12

A mixed solution having the following composition:

| | |
|---|---|
| $H_2 6^* \cdot 6H_2O$ | 17.3 g. |

| | |
|---|---|
| $Ti(C_4H_9O)_4$ | 108.0 ml |
| $RhCl_3$ | 1.6 g. |
| $BiCl_3$ | 3.9 g. |
| $Si(C_2H_5O)_4$ | 52 ml |
| ethanol | 334.0 ml. and |
| n-butanol | 666.0 ml. | was prepared. A soda-lime glass sheet of 3 mm. thick and 30cm. × 30 cm. was thoroughly washed, dried and then dipped in said solution, after which said glass sheet was slowly drawn out of the solution so that said solution may adhere uniformly to the glass surface. Said glass sheet was then heated at 600° C. for 10 minutes in a muffle furnace. The product thus obtained showed an average reflectivity of approximately 45 percent in 700 m$\mu$ to 900 m$\mu$. The present product had the following mechanical strength, weatherproof property and chemical properties:

Hardness of film:
  it could not be hurt with a pen tip and razor blade.
Smoothness of surface:
  high smoothness (i.e. low coefficient of friction) was felt when rubbed with a pen tip.
Weatherproof property:
  weather-O-meter (corresponding to 3 years)    no change Chemical properties:
  $H_2O$ (60° to 80° C.) 4 to 12 hr.    no change
  1N(COOH)$_2$ aqueous solution (60° to 80° C.) 4 to 12 hr. no change
Solarization:
  Exposure to 500W Xenon Lamp 24 to 72 hr.    no change

EXAMPLE 13

The results shown below were obtained when soda-lime glass sheets each having 3 mm. thick and 30cm. × 3030 cm. were treated under the same condition as in example 12 with each solution of the following compositions.

| | | | | | | |
|---|---|---|---|---|---|---|
| $H_2PtCl_6 \cdot 6H_2C$, g | 17.3 | 17.3 | 17.3 | 17.3 | 17.3 | 17.3 |
| $BiCl_3$, g | 3.9 | 3.9 | 3.9 | 3.9 | 3.9 | 3.9 |
| $RhCl_3$, g | 1.6 | 1.6 | 1.6 | 1.6 | 1.6 | 1.6 |
| $TaCl_5$, g | 210.7 | | | | | |
| $Th(NO_3)_3 \cdot 4H_2O$, g | | 324.8 | | | | |
| $ZrCl_4$, g | | | 143.2 | | | |
| $SnCl_4$, g | | | | 153.2 | | |
| $NbCl_5$, g | | | | | 158.9 | |
| $WCl_6$, | | | | | | 233.3 |
| Ethanol, ml | 334.0 | 334.0 | 334.0 | 334.0 | 334.0 | 334.0 |
| n-Butanol, ml | 666.0 | 666.0 | 666.0 | 666.0 | 666.0 | 666.0 |
| Average reflectivity in 700 m$\mu$ to 900 m$\mu$, percent | 40 | 40 | 40 | 40 | 40 | 40 |

EXAMPLE 14

A mixed solution having the following composition:

| | |
|---|---|
| $Ti(C_4H_9O)_4$ | 268.8 ml. |
| ethanol | 334.0 ml. and |
| n-butanol | 666.0 ml. | was prepared. A soda-lime glass sheet of 3 mm. thick and 30cm. × 3030 cm. was thoroughly washed, dried and then dipped in said solution. Thereafter, said glass sheet was slowly drawn out of the solution. Said glass sheet was dried at 110° C. for 10 minutes in a muffle furnace and then allowed to cool to the room temperature.

Thereafter, said glass sheet was dipped in a mixed solution composed of

| | |
|---|---|
| $HAuCl_4 \cdot 4H_2O$ | 8.6 g. |
| $H_2OtCl_6 \cdot 6H_2O$ | 3.3 g. |
| $TaCl_5$ | 12.0 g. |
| $BiCl_3$ | 3.9 g. |
| $RhCl_3$ | 1.3 g. |
| ethanol | 334.0 ml. and |
| n-butanol | 666.0 ml. | after which the glass sheet was slowly drawn out of the solution.

The thus drawn out glass sheet was heated at 600° C. for 10 minutes in a muffle furnace.

The present product thus obtained had optical characteristics of an average reflectivity of approximately 40 percent in 700 m$\mu$ to 900 m$\mu$ as shown by a curved solid line 14 and a curved broken line 14, in FIG. 2.

We claim:
1. A method for the manufacture of infrared reflecting glass, comprising dissolving in at least one lower aliphatic alcohol having one to four carbon atoms, at least one compound in a quantity capable of forming a small but effective amount of a metal selected from the group consisting of metallic gold and metallic platinum upon heating and at least one compound capable of forming upon heating a metallic oxide having a refractive index higher than that of glass and selected from the group consisting of at least one of $TiO_2$, $Ta_2O_5$, $WO_3$, $ZrO_2$, $ThO_2$, $SnO_2$ and $Nb_2O_5$, coating a surface of glass with said solution, and heating said coated glass to a temperature sufficient to decompose said at least one compound to produce on said surface a light-transmissive film consisting essentially of microscopically divided particles of said metal dispersed in said metallic oxide, said amount being effective to improve the infrared reflectivity of the film while leaving the film light-transmissive.

2. A method as claimed in claim 1, said metal being gold and said compound capable of forming metallic gold being selected from the group consisting of chloroauric acid, gold-alkyl mercaptide and diethyl monobromogold.

3. A method as claimed in claim 1, said metal being metallic platinum and said compound capable of forming metallic platinum being chloroplatinic acid.

4. A method as claimed in claim 1, said compound capable of forming a metallic oxide being at least one compound selected from the group consisting of alkoxides, halogenides, nitrates and acetates of Ti, Ta, W, Zr, Th, Sn and Nb.

5. Infrared reflecting glass manufactured by the method of claim 1.

* * * * *